(12) United States Patent
Siddiqui et al.

(10) Patent No.: US 10,598,143 B2
(45) Date of Patent: Mar. 24, 2020

(54) AUTOMATIC ENGINE STOPPING AND STARTING FOR A PARKED VEHICLE

(71) Applicant: Ford Global Technologies, LLC, Dearborn, MI (US)

(72) Inventors: Siraj Siddiqui, Lasalle (CA); Ahmed Awadi, Farmington Hills, MI (US); Eric Rademacher, Beverly Hills, MI (US); Hussam Makkiya, Dearborn, MI (US); Hafiz Khafagy, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/523,921

(22) Filed: Jul. 26, 2019

(65) Prior Publication Data
US 2019/0345908 A1    Nov. 14, 2019

Related U.S. Application Data

(62) Division of application No. 15/906,604, filed on Feb. 27, 2018, now Pat. No. 10,451,020.

(51) Int. Cl.
*F02N 11/08* (2006.01)

(52) U.S. Cl.
CPC .. *F02N 11/0814* (2013.01); *F02N 2200/0802* (2013.01); *F02N 2200/102* (2013.01); *F02N 2200/124* (2013.01); *F02N 2200/125* (2013.01)

(58) Field of Classification Search
CPC ........... F02N 11/0814; F02N 2200/102; F02N 2200/125; F02N 2200/0802; F02N 2200/124
See application file for complete search history.

(56) References Cited

U.S. PATENT DOCUMENTS

| 9,731,722 B2 | 8/2017 | Khafagy et al. |
| 2011/0238284 A1 | 9/2011 | Bollig et al. |
| 2014/0249730 A1 | 9/2014 | Hilberer |

*Primary Examiner* — Xiao En Mo
(74) *Attorney, Agent, or Firm* — David Kelley; McCoy Russell LLP

(57) ABSTRACT

Systems and methods for operating an engine that may be automatically stopped and started responsive to vehicle operating conditions are disclosed. In one example, the engine may be automatically started after it has been automatically stopped in response to a driver applying a brake pedal while the vehicle's transmission is engaged in park. The engine may be started to increase transmission pump pressure prior to engaging a gear to reduce vehicle launch time.

8 Claims, 11 Drawing Sheets

AUTOMATIC ENGINE STOPPING AND STARTING FOR A PARKED VEHICLE

CROSS REFERENCE TO RELATED APPLICATION

The present application is a divisional of U.S. Non-Provisional Patent Application No. 15/906,604, entitled "AUTOMATIC ENGINE STOPPING AND STARTING FOR A PARKED VEHICLE," and filed on Feb. 27, 2018. The entire contents of the above-referenced application are hereby incorporated by reference for all purposes.

FIELD

The present description relates to systems and method for automatically starting an engine of a vehicle that has been stopped with the vehicle's transmission engaged in park. The system and methods may improve launching of the vehicle after the vehicle is disengaged from park.

BACKGROUND AND SUMMARY

An engine of a vehicle may be automatically stopped via a controller in response to vehicle operating conditions. For example, the engine may be stopped without the vehicle's driver specifically requesting an engine stop via an input that is dedicated to engine stopping and starting. The engine may be stopped to conserve fuel while the vehicle's driver (e.g., human or autonomous) waits for traffic conditions to clear or until the driver is ready to leave the vehicle's present location. The engine may be stopped while the vehicle's transmission is engaged in a gear, in neutral, or in park. If the vehicle is in a gear while the engine is stopped, the vehicle may be held in the gear by supplying hydraulic pressure to the transmission gear clutches via an electric pump. Similarly, at least some of the transmission's gear clutches may be engaged if the transmission is in neutral. By keeping one or more gear clutches engaged while the engine is stopped, engine torque may be transferred to the vehicle's wheels sooner after an engine restart because less fluid may have to be supplied to the transmission clutches. However, if the transmission is engaged in park, all gear clutches may have to be released. Consequently, if the engine is automatically restarted, significantly more transmission fluid may have to be delivered to the gear clutches before engine torque may be transferred to the vehicle's wheels. Having to supply larger amounts of fluid to engage transmission gear clutches after an automatic engine stop may delay when engine torque is available to the vehicle's wheels, thereby delaying vehicle launch. As such, it may be desirable to provide a way of reducing an amount of time it takes to fill transmission clutches of a vehicle that has an engine that has been automatically stopped while the vehicle's transmission is engaged in park.

The inventors herein have recognized the above-mentioned issues and have developed a vehicle operating method, comprising: automatically stopping an engine via a controller without receiving specific input from a driver via a dedicated engine start/stop input; and automatically starting the engine via the controller in response to applying a brake pedal while the engine is automatically stopped and a transmission is engaged in park.

By automatically starting an engine of a vehicle that has been automatically stopped in response to applying a brake pedal while the transmission is engaged in park, it may be possible to provide the technical result of reducing a delay in vehicle launch. In particular, the engine may be started before the driver shifts from park to drive so that the engine may rotate the pump within the transmission and increase the availability of fluid at the transmission's clutches before the transmission is shifted into gear. Conversely, if engine starting where delayed until the vehicle's driver moved a shifter from park to neutral, then the buildup of transmission fluid pressure would be delayed until shifter motion was detected. However, shifting the transmission from park into drive requires applying a brake pedal before shifter movement is allowed so that the possibility of vehicle motion may be reduced. Starting the engine in response to the earlier application of the brake pedal allows the engine to start and the transmission fluid pump output to increase before the shifter is moved, thereby decreasing an amount of time between when the shifter is moved and when torque is made available to vehicle wheels via pressurized fluid flowing from the transmission pump to the transmission gear clutches.

The present description may provide several advantages. In particular, the approach may reduce an amount of time between when a shifter is moved and engine torque is provided to vehicle wheels. Further, the approach may be applied to a variety of scenarios where a vehicle's transmission is engaged in park while the vehicle's engine is automatically stopped. Further still, variants of the approach may further improve the availability of transmission fluid to transmission clutches after an automatic engine stop in response to road conditions.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
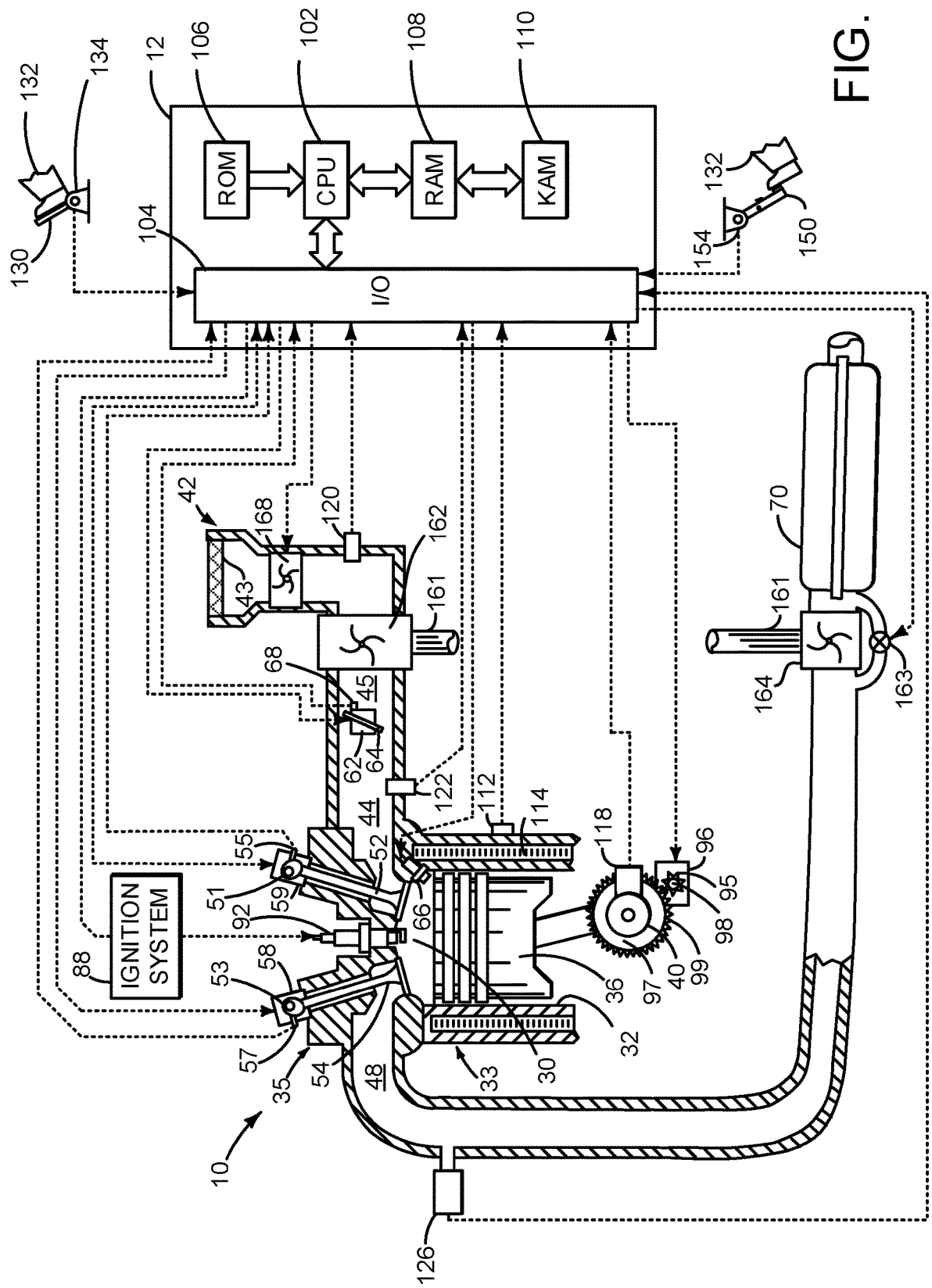
FIG. 1 is a schematic diagram of an engine.
Figure 2:
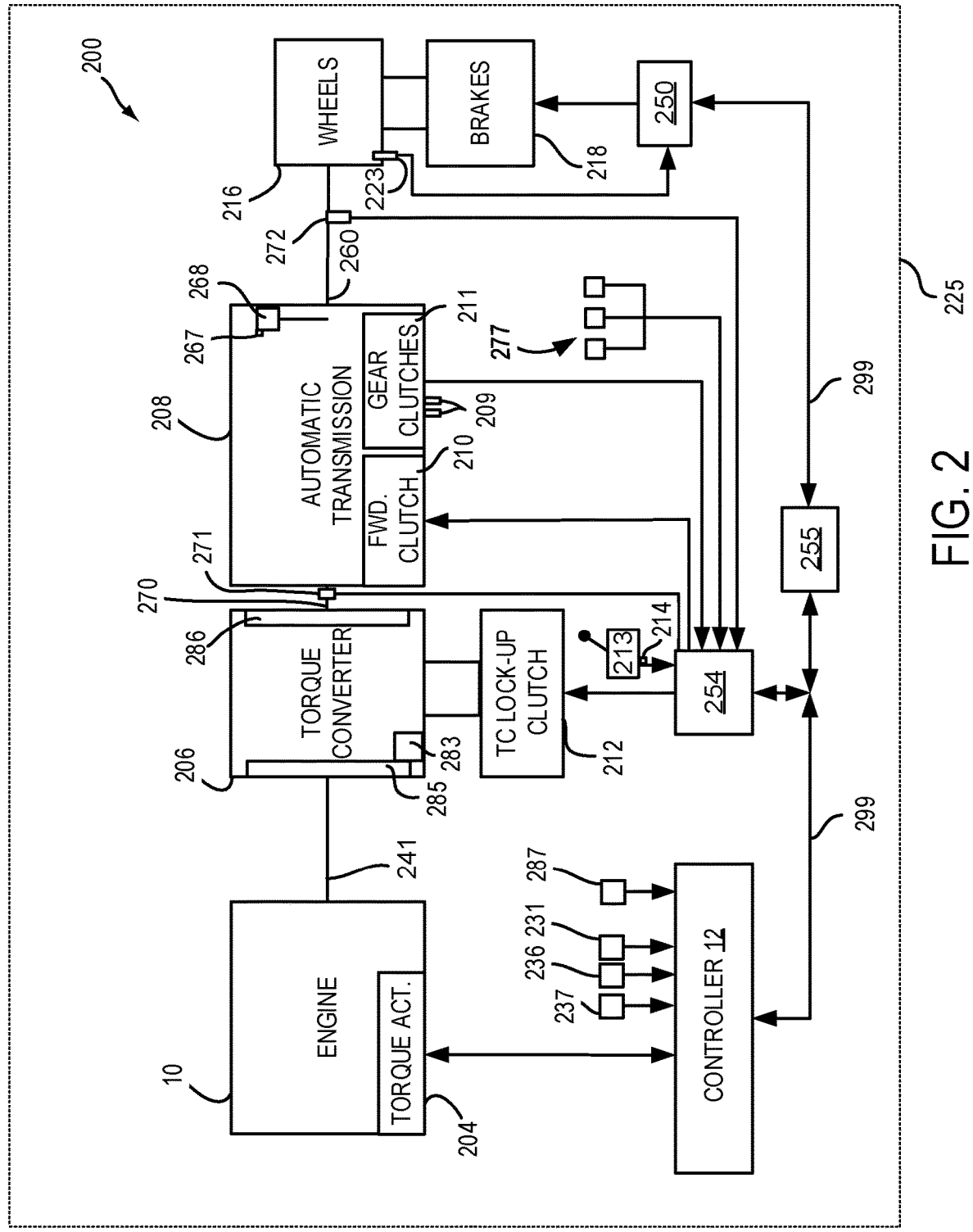
FIG. 2 is a schematic diagram of a vehicle driveline including the engine and an automatic transmission.
Figure 3:
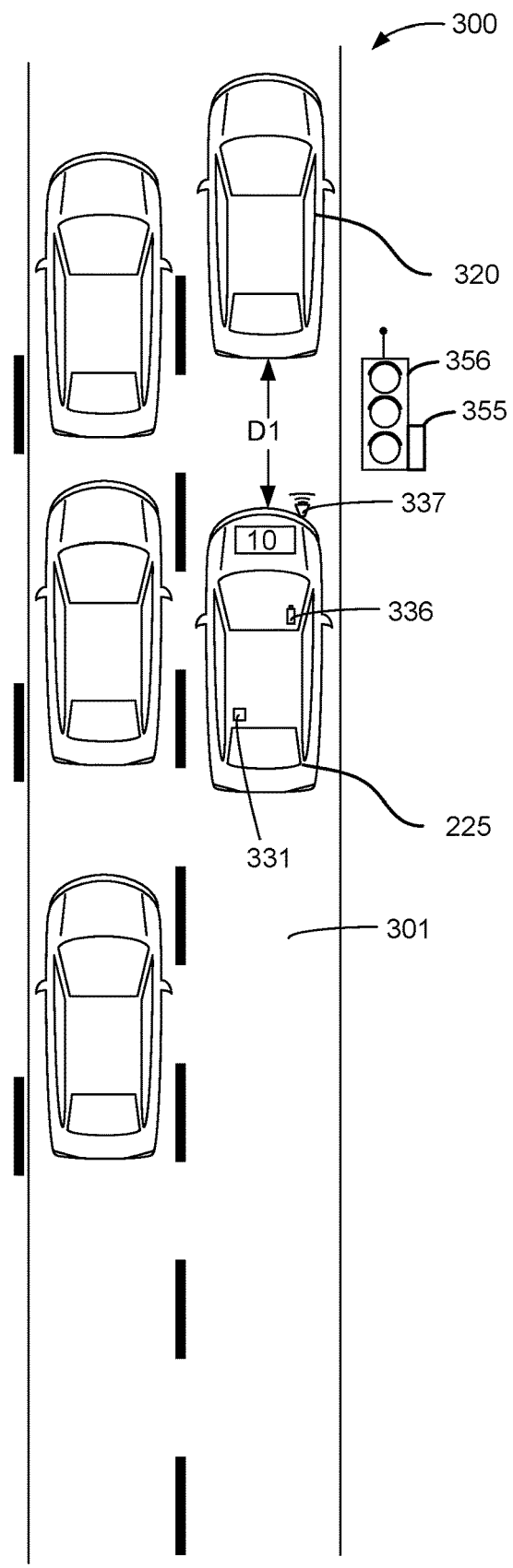
FIG. 3 shows an example vehicle that includes the engine and driveline of FIGS. 1 and 2 operating in traffic.

The present description is related to controlling an engine that may be automatically stopped and started to conserve fuel. The internal combustion engine may be configured as shown in FIG. 1. The internal combustion engine may be included in a driveline or powertrain of a vehicle as shown in FIG. 2. The engine and powertrain may be included in a vehicle as is shown in FIG. 3. The engine may be automatically stopped and started as is shown in the sequences of FIGS. 4A-4H. The engine may be automatically stopped and started according to the method of FIGS. 5-8.

Referring to FIG. 1, internal combustion engine 10, comprising a plurality of cylinders, one cylinder of which is shown in FIG. 1, is controlled by electronic engine controller 12. The controller 12 receives signals from the various sensors of FIG. 1 and employs the various actuators of FIG. 2 to adjust engine operation based on the received signals and instructions stored in controller memory. For example, controller 12 may automatically start engine 10 via activating engine starter 96 when a human or autonomous driver applies brake pedal 154.

Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Optional starter 96 (e.g., low voltage (operated with less than 30 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft.

Combustion chamber 30 is shown communicating with intake manifold 44 and exhaust manifold 48 via respective intake poppet valve 52 and exhaust poppet valve 54. Each intake and exhaust valve may be operated by an intake camshaft 51 and an exhaust camshaft 53. The position of intake camshaft 51 may be determined by intake camshaft sensor 55. The position of exhaust camshaft 53 may be determined by exhaust camshaft sensor 57. Intake valves may be held open or closed over an entire engine cycle as the engine rotates via deactivating intake valve actuator 59, which may electrically, hydraulically, or mechanically operate intake valves. Alternatively, intake valves may be opened and closed during a cycle of the engine. Exhaust valves may be held open or closed over an entire engine cycle (e.g., two engine revolutions) as the engine rotates via deactivating exhaust valve actuator 58, which may be electrically, hydraulically, or mechanically operate exhaust valves. Alternatively, exhaust valves may be opened and closed during a cycle of the engine.

Fuel injector 66 is shown positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Alternatively, compressor 162 may be electrically powered. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Wastegate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

A vehicle and/or engine operating mode may be selected via a human driver via human/machine interface 8. Human/machine interface may be comprised of a switch, touch screen, or other input device.

Controller 12 is shown in FIG. 1 as a conventional microcomputer including: microprocessor unit 102, input/output ports 104, read-only memory 106 (e.g., non-transitory memory), random access memory 108 (e.g., transitory memory), keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by human driver 132; a position sensor 154 coupled to brake pedal 150 for sensing force applied by human driver 132, a measurement of engine manifold absolute pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a powertrain or driveline 200. The powertrain of FIG. 2 includes engine 10 shown in FIG. 1. Powertrain 200 is shown including vehicle system controller 255, engine controller 12, transmission controller 254, and brake controller 250. The controllers may communicate over controller area network (CAN) 299. Each of the controllers may provide information to other controllers such as torque output limits (e.g., torque output of the device or component being controlled not to be exceeded), torque input limits (e.g., torque input of the device or component being controlled not to be exceeded), torque output of the device being controlled, sensor and actuator data, diagnostic information (e.g., information regarding a degraded transmission, information regarding a degraded engine, information regarding degraded brakes). Further, the vehicle system controller 255 may provide commands to engine controller 12, transmission controller 254, and brake controller 250 to achieve driver input requests and other requests that are based on vehicle operating conditions.

For example, in response to a driver releasing an accelerator pedal and vehicle speed, vehicle system controller 255 may request a desired wheel torque or a wheel power level to provide a desired rate of vehicle deceleration. The desired wheel torque may be provided by vehicle system controller 255 requesting a braking torque from brake controller 250.

In other examples, the partitioning of controlling powertrain devices may be partitioned differently than is shown in FIG. 2. For example, a single controller may take the place of vehicle system controller 255, engine controller 12, transmission controller 254, and brake controller 250. Alternatively, the vehicle system controller 255 and the engine controller 12 may be a single unit while the transmission controller 254 and the brake controller 250 are standalone controllers.

In this example, powertrain 200 may be powered by engine 10. Engine 10 may be started with an engine starting system shown in FIG. 1. Further, torque of engine 10 may be adjusted via torque actuator 204, such as a fuel injector, throttle, etc.

An engine output torque may be transmitted to torque converter 206. Torque converter 206 includes a turbine 286 to output torque to input shaft 270. Transmission input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is electrically operated by controller 254. Alternatively, TCC may be hydraulically locked. In one example, the torque converter may be referred to as a component of the transmission.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to an input shaft 270 of automatic transmission 208. Alternatively, the torque converter lock-up clutch 212 may be partially engaged, thereby enabling the amount of torque directly relayed to the transmission to be adjusted. The transmission controller 254 may be configured to adjust the amount of torque transmitted by torque converter 212 by adjusting the torque converter lock-up clutch in response to various engine operating conditions, or based on a driver-based engine operation request. Torque converter 206 also includes mechanically driven pump 283 that pressurizes fluid to operate gear clutches 211. Pump 283 is driven via impeller 285, which rotates at a same speed as engine 10.

Automatic transmission 208 includes gear clutches (e.g., gears 1-10) 211 and forward clutch 210. Automatic transmission 208 is a fixed step ratio transmission. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the gear clutches via shift control solenoid valves 209. Torque output from the automatic transmission 208 may also be relayed to wheels 216 to propel the vehicle via output shaft 260. Specifically, automatic transmission 208 may transfer an input driving torque at the input shaft 270 responsive to a vehicle traveling condition before transmitting an output driving torque to the wheels 216. Transmission controller 254 selectively activates or engages TCC 212, gear clutches 211, and forward clutch 210. Transmission controller also selectively deactivates or disengages TCC 212, gear clutches 211, and forward clutch 210. Transmission controller 254 removes pressurized fluid from gear clutches 211 when transmission 208 is engaged in park. Further, transmission controller 254 engages parking pawl 268 to reduce transmission shaft movement and vehicle movement when shifter 213 is in a park position. A position of shifter (e.g., Park, neutral, or drive) may be indicated via shifter position sensor 214. Parking pawl 268 may engage output shaft 260 or a gear within transmission 208 when transmission 208 is commanded to park. Actuator 267 may engage or disengage parking pawl 268 via commands sent via controller 12.

Further, a frictional force may be applied to wheels 216 by engaging friction wheel brakes 218. In one example, friction wheel brakes 218 may be engaged in response to the driver pressing their foot on a brake pedal (not shown) and/or in response to instructions within brake controller 250. Further, brake controller 250 may apply brakes 218 in response to information and/or requests made by vehicle system controller 255. In the same way, a frictional force may be reduced to wheels 216 by disengaging wheel brakes 218 in response to the driver releasing his foot from a brake pedal, brake controller instructions, and/or vehicle system controller instructions and/or information. For example, vehicle brakes may apply a frictional force to wheels 216 via controller 250 as part of an automated engine stopping procedure.

In response to a request to accelerate vehicle 225, vehicle system controller may obtain a driver demand torque or power request from an accelerator pedal or other device. Vehicle system controller 255 then commands engine 10 in response to the driver demand torque. Vehicle system controller 255 requests the engine torque from engine controller 12. If engine torque is less than a transmission input torque limit (e.g., a threshold value not to be exceeded), the torque is delivered to torque converter 206, which then relays at least a fraction of the requested torque to transmission input shaft 270. Transmission controller 254 selectively locks torque converter clutch 212 and engages gears via gear clutches 211 in response to shift schedules and TCC lockup schedules that may be based on input shaft torque and vehicle speed.

Accordingly, torque control of the various powertrain components may be supervised by vehicle system controller 255 with local torque control for the engine 10, transmission 208, and brakes 218 provided via engine controller 12, transmission controller 254, and brake controller 250.

As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output.

Transmission controller 254 receives transmission input shaft position via position sensor 271. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, controller 254 may count shaft position pulses over a predetermined time interval to determine transmission output shaft velocity. Transmission controller 254 may also differentiate transmission output shaft velocity to determine transmission output shaft acceleration. Transmission controller 254, engine controller 12, and vehicle system controller 255, may also receive addition transmission information from sensors 277, which may include but are not limited to pump output line pressure sensors, transmission hydraulic pressure sensors (e.g., gear clutch fluid pressure sensors), and ambient temperature sensors.

Brake controller 250 receives wheel speed information via wheel speed sensor 223 and braking requests from vehicle system controller 255. Brake controller 250 may also receive brake pedal position information from brake pedal sensor 154 shown in FIG. 1 directly or over CAN 299. Brake controller 250 may provide braking responsive to a wheel torque command from vehicle system controller 255. Brake controller 250 may also provide anti-skid and vehicle stability braking to improve vehicle braking and stability. As such, brake controller 250 may provide a wheel torque limit (e.g., a threshold negative wheel torque not to be exceeded) to the vehicle system controller 255.

Controller 12, or alternatively vehicle controller 255, may receive data from range detection and ranging system 237 (e.g., RADAR or LIDAR) to determine a distance between vehicles. Further, controller 12 or vehicle controller 255 may receive data from infrastructure via radio frequency transceiver 231. Alternatively, 231 may be comprised of a receiver and transmitter. Controller 12 or vehicle controller 255 may also receive data from camera 236 to determine road conditions. In some examples, controller 12 or vehicle controller 255 may receive vehicle position information from global positioning system (GPS) receiver 287 to determine the position of vehicle 225.

Referring now to FIG. 3, vehicles traveling on a road are shown. Road 300 includes a first vehicle 225 including engine 10 with all the components shown in FIG. 1 and a second vehicle 320 stopped (not moving on the road) in a first lane 301 of road 300. The engine of first vehicle 225 has been automatically stopped (not rotating). Vehicle range sensors 337 (e.g. RADAR or LIDAR) onboard vehicle 225 may report a distance D1 between first vehicle 250 and second vehicle 320 when second vehicle 320 is traveling in the path (e.g., same lane) of first vehicle 225 and when there are no intermediate vehicles between first vehicle 225 and second vehicle 320. The distance D1 may be updated at a predetermined rate (e.g., every 100 milliseconds) and supplied to controller 12 shown in FIG. 1. If the distance D1 increases after first vehicle 225 is stopped, controller 12 may determine that second vehicle 320 is moving while the engine 10 of first vehicle 225 is automatically stopped with the transmission in park so that engine 10 may be automatically started before the vehicle's driver shifts from park to drive. By starting the engine earlier than the driver shifts the transmission, it may be possible for the transmissions pump to pressurize fluid in the transmission so that gears of the transmission may be shifted without hesitation when commanded by the driver. The ability to shift into gear on command without having for the transmission pump to build pressure may reduce vehicle launch time after the engine has been automatically stopped and the transmission is engaged in park.

Camera 336 may also detect road conditions such as objects in the path of vehicle 225, traffic signs that are being approached by vehicle 225, operating states of traffic lights 356, highway on ramps, etc. Camera 336 may supply such information in the form of data to controller 12 or vehicle controller 255 that is in communication with controller 12. If camera 336 detects second vehicle 320 moving in front of first vehicle 225 while first vehicle 225 is stopped, controller 12 may determine that second vehicle 320 is moving. Similarly, if camera 336 detects that traffic light controller 355 has just changed traffic light 356 from red to green while first vehicle 225 is stopped and while engine 10 is automatically stopped with the transmission in park in front of traffic light 356, then controller 12 may determine that acceleration of first vehicle is expected from data provided by the camera so that the engine 10 may be automatically started sooner. Starting the automatically stopped engine sooner may prevent vehicle launch delays.

Receiver 231 may receive traffic data from traffic signal controller 355 that indicates traffic light phase and timing. Receiver 231 may communicate the same information to controller 12 of FIG. 1 and controller 12 may determine that vehicle acceleration or an increase of driver demand torque is anticipated or expected from the data. For example, if controller 12 determines that traffic light 356 is about to change from red to green while first vehicle 225 is stopped and while engine 10 is automatically stopped with the transmission in park in front of traffic signal 356, controller 12 may determine that first vehicle 225 is expected to accelerate shortly thereafter. Engine 10 may then be automatically started in response to the indication of expected or anticipated acceleration of first vehicle 225. By starting the engine 10 earlier than the driver shifts the transmission, it may be possible for the transmissions pump to pressurize fluid in the transmission so that gears of the transmission may be shifted without hesitation when commanded by the driver.

Thus, the various sensors shown in FIG. 3 may provide data that allows controller 12 or vehicle controller 255 to anticipate vehicle movement of vehicle 225 while vehicle 225 is stopped and its engine is automatically stopped. The data may be processed while at a rate that exceeds a human's response time so that engine 10 may be started in anticipation of the driver shifting from park to a gear so that pressure may be made available to shift transmission gears.

Thus, the system of FIGS. 1-3 provide for a system, comprising: a vehicle including an engine; a transmission coupled to the engine vehicle sensors configured to sense motion of vehicles in the path of the vehicle; and a controller including executable instructions stored in non-transitory memory to automatically stop the engine, and instructions to automatically start the engine after the engine is most recently automatically stopped, the engine automatically started while the transmission is engaged in park in response to the vehicle sensors detecting motion of vehicles in the path of the vehicle. The system further comprises additional instructions to automatically start the engine after the engine is most recently automatically stopped, the engine automatically started while the transmission is engaged in park in response to output of an infrastructure device that broadcasts road conditions. The system further comprises additional instructions to automatically start the engine after the engine is most recently automatically stopped, the engine automatically started while the transmission is engaged in park in response to a human driver applying a brake pedal while the engine is automatically stopped and a transmission is engaged in park. The system includes where the engine is automatically stopped while the transmission is in park. The system includes where the engine is automatically stopped while the transmission is in drive. The system includes where the engine is automatically stopped while the transmission is in neutral. The system includes where the vehicle sensors configured to sense motion of vehicles include light detection and ranging (LIDAR) systems. The system includes where the vehicle sensors configured to sense motion of vehicles include radio detection and ranging (RADAR) systems.

Figure 4A:
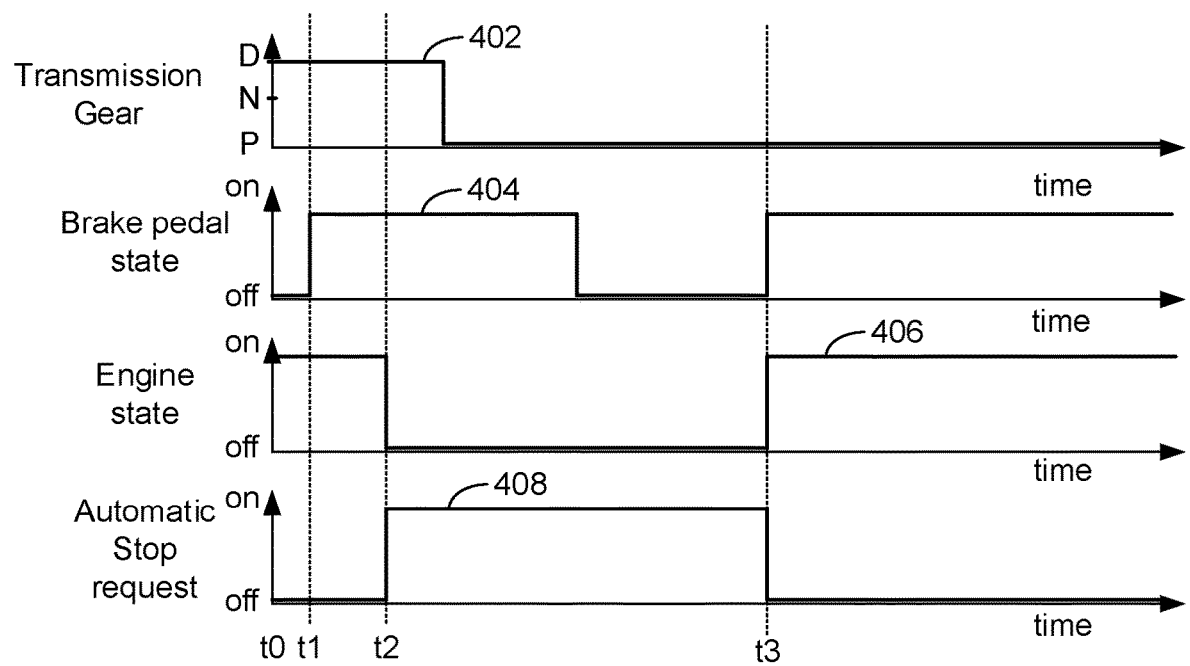
FIGS. 4A-4H show plots of automatic engine stopping and starting sequences.

Referring now to FIG. 4A, an example vehicle operating sequence is shown. The sequence of FIG. 4A may be provided according to the method of FIGS. 5-8 in conjunction with the system of FIGS. 1-3. The plots shown in FIG. 4A occur at the same time and are aligned in time. The vertical lines at times t0-t3 represent times of interest in the sequence.

The sequences of FIGS. 4B-4F include similar plots that show the same variables being plotted against time. Therefore, for the sake of brevity, the description of each plot is not repeated. Note that the traces for each plot have different identification numbers even though they represent the same variables. For example, trace 402 in FIG. 4A represents transmission gear and trace 410 in FIG. 4B also represents transmission gear. A human driver or autonomous driver may apply and release the brake pedal as is shown in the sequences. The human driver may also shift the transmission as is shown in the sequences.

The first plot from the top of FIG. 4A is a plot of engaged transmission state versus time. The vertical axis represents engaged transmission state and the transmission states are listed along the vertical axis. The letter "D" indicates drive where the transmission may be engaged (e.g., gear clutches transfer torque) in a forward gear (e.g., 1-10) and pressurized fluid is supplied to one or more gear clutches, the letter "N" indicates neutral and pressurized fluid is supplied to one or more gear clutches, the letter "P" indicates park and fluid pressure is relieved from all gear clutches to disengage the gear clutches (e.g., the gear clutches do not transfer torque) while a parking pawl is engaged to limit motion of the wheels and driveline. The horizontal axis represents time and time increases from the left side of the figure to the right side of the figure. Trace 402 represents transmission engagement state.

The second plot from the top of FIG. 4A is a plot of brake pedal state versus time. The vertical axis represents brake pedal state. The brake pedal is applied or on when trace 404 is near the arrow of the vertical axis. The brake pedal is not applied or off when trace 404 is near the horizontal axis. The horizontal axis represents time and time increases from the left side of the figure to the right side of the figure.

The third plot from the top of FIG. 4A is a plot of engine operating state versus time. The vertical axis represents engine operating state. The engine is on (e.g., combusting air and fuel) when trace 406 is at a higher level near the vertical axis arrow. The engine is off (e.g., not combusting air and fuel) when trace 406 is at a lower level near the horizontal axis. The horizontal axis represents time and time increases from the left side of the figure to the right side of the figure.

The fourth plot from the top of FIG. 4A is a plot an automatic engine stop request state versus time. The vertical axis represents automatic engine stop request state. An automatic engine stop request is present when trace 408 is at a higher level near the vertical axis arrow. An automatic engine stop request is not present when trace 408 is at a lower level near the horizontal axis. The engine is automatically stopped when the automatic engine stop request state is at the higher level. The engine is automatically started when the automatic engine stop request trace 408 transitions from the higher level to the lower level. The engine remains on when the automatic engine stop request trace is at the lower level. The horizontal axis represents time and time increases from the left side of the figure to the right side of the figure.

At time t0, the engine is on and the transmission is engaged in drive. The brake pedal is not applied and the automatic engine stop request is not asserted. Such conditions may be present while a vehicle is traveling on a road. At time t1, the driver (human or autonomous) applies the brake pedal causing vehicle speed to be reduced (not shown). As time increases, the engine is automatically stopped at time t2 as indicated by the automatic stop request being asserted and the engine state transitioning to "off." The engine may be automatically stopped in response to various vehicle operating conditions including driver demand torque being less than a threshold torque and battery state of charge (SOC) being greater than a threshold SOC.

Between time t2 and time t3, the driver shifts the transmission from drive to park and fully releases the brake pedal. The transmission gear clutches are released (e.g., fluid pressure applied to the gear clutches is reduced until the gear clutch's capacity to transfer torque is zero) and a parking pawl of the transmission is engaged to limit vehicle movement when the transmission is engaged in park. By reducing pressure in the gear clutches the engine is decoupled from the vehicle's rear wheels, but fluid pressure supplied to the clutches has to be increased before engine torque may be transmitted to the vehicle's wheels.

At time t3, the driver applies the brake pedal to begin the process of shifting from park into drive. The engine is automatically started even though the driver does not shift from park to drive. The engine is started so that pressure output from the transmission pump may be increased before the transmission is shifted into drive. The higher outlet pressure of the transmission pump may allow the transmission to shift to drive (e.g., first gear) in a shorter amount of time as compared to if the engine were restarted when the transmission was shifted from park to drive. Thus, the controller automatically restarts the engine in response to the brake pedal being applied after the brake pedal was fully released.

In this way, the engine may be started early while the transmission is in park to increase output of the transmission pump before the driver moves the vehicle's shifter into drive. The brake pedal being applied before the transmission is shifted provides lead time to start the engine and increase transmission pump output so that the gears may engage quickly when the gear shifter enters the drive position.

Figure 4B:
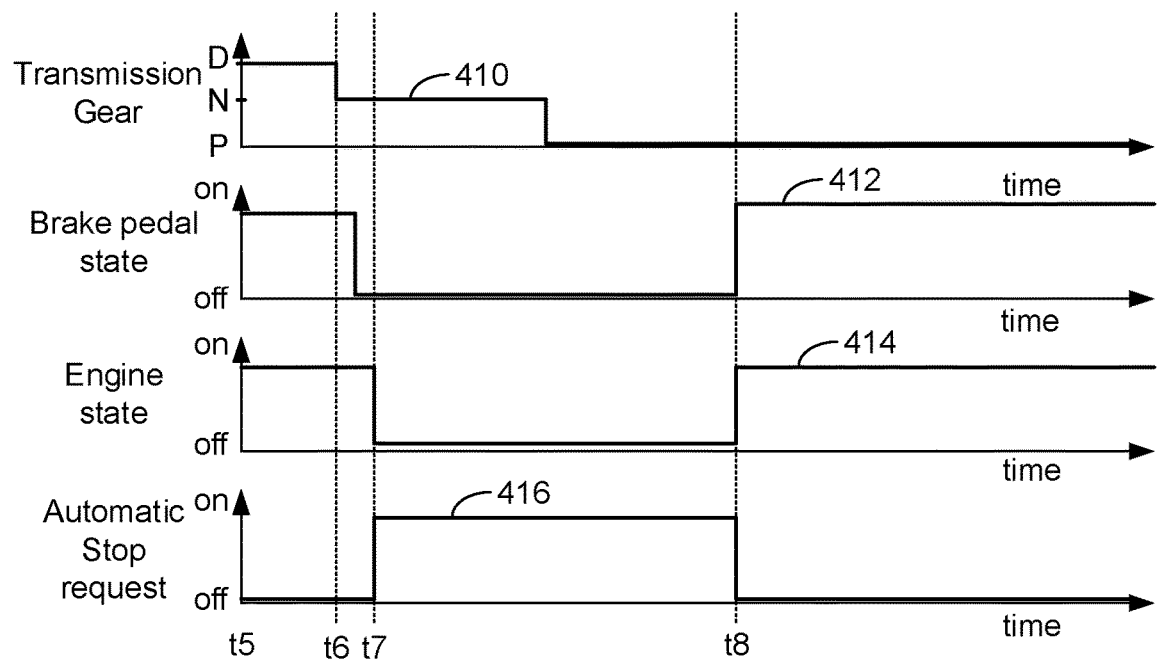

Referring now to FIG. 4B, a second engine automatic stopping and starting sequence is shown. At time t5, the transmission is in drive as is indicated by trace 410 and the engine is on as is indicated by trace 414. The driver is applying the brake pedal and the automatic engine stop request is not asserted. The vehicle may be stopped or decelerating during such conditions.

At time t6, the driver shifts the transmission into neutral while applying the brake pedal. The engine remains on and the automatic engine stop request is not asserted. Such conditions may be present when the vehicle is stopped in a traffic jam. The driver fully releases the brake pedal after the transmission is shifted into park. The vehicle does not move when the brake pedal is released since the transmission is engaged in park.

At time t7, the engine is automatically stopped as indicated by engine state trace 414 in response to the automatic engine stop request indicated by trace 416. The engine is automatically stopped in response to vehicle conditions, such as driver demand torque being less than a threshold torque and battery SOC being greater than a threshold SOC. The engine stop is indicated by trace 414 transitioning to a lower level and trace 416 transitioning to a higher level. The driver shifts the transmission into park while the brake pedal is fully released between time t7 and time t8.

At time t8, the driver applies the brake pedal and the automatically stopped engine is restarted in response to the brake pedal being applied as is indicated by engine state trace 414 transitioning to a higher level and the automatic engine stop request state transitioning to a lower level. The transmission is engaged in park, which indicates that the driver has to first apply the brake pedal before shifting from park to neutral or drive. Therefore, applying the brake pedal when the transmission is engaged in park may be interpreted as a leading indicator that the driver will shortly be requesting to accelerate the vehicle. As such, the engine may be started earlier when the brake pedal is applied, instead of later when the gear shifter is moved from park to drive. Consequently, fluid pressure to shift the gear clutches may be increase earlier so that the transmission may be timely shifted from park to drive.

Figure 4C:
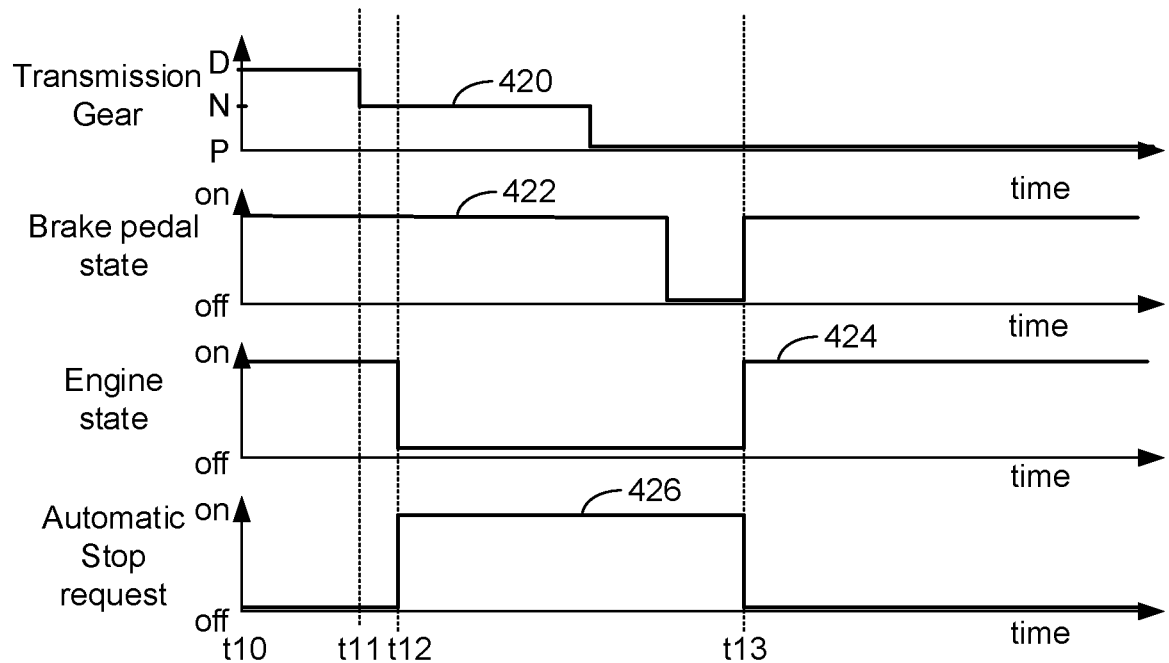

Referring now to FIG. 4C, a third engine automatic stopping and starting sequence is shown. At time t10, the transmission is in drive as is indicated by trace 420 and the engine is on as is indicated by trace 424. The driver is applying the brake pedal and the automatic engine stop request is not asserted. The vehicle may be stopped or decelerating during such conditions.

At time t11, the driver shifts the transmission into neutral while applying the brake pedal. The engine remains on and the automatic engine stop request is not asserted. Such conditions may be present when the vehicle is stopped in a traffic jam. The driver continues to apply the brake pedal after the transmission is shifted into neutral.

At time t12, the engine is automatically stopped as indicated by engine state trace 424 in response to the automatic engine stop request indicated by trace 426. The engine is automatically stopped in response to vehicle conditions, such as driver demand torque being less than a threshold torque and battery SOC being greater than a threshold SOC. The engine stop is indicated by trace 424 transitioning to a lower level and trace 426 transitioning to a higher level.

Between time t12 and time t13, the driver first shifts the transmission into park while the brake pedal is applied, then the driver releases the brake pedal. The engine remains off and the automatic engine stop request remains on or asserted.

At time t13, the driver applies the brake pedal and the automatically stopped engine is restarted in response to the brake pedal being applied as is indicated by engine state trace 424 transitioning to a higher level and the automatic engine stop request state 426 transitioning to a lower level. The transmission is engaged in park, which allows application of the brake pedal to be interpreted as an early indication of a driver requesting vehicle acceleration. Therefore, the engine may be started earlier when the brake pedal is applied, instead of later when the gear shifter is moved from park to drive.

Figure 4D:
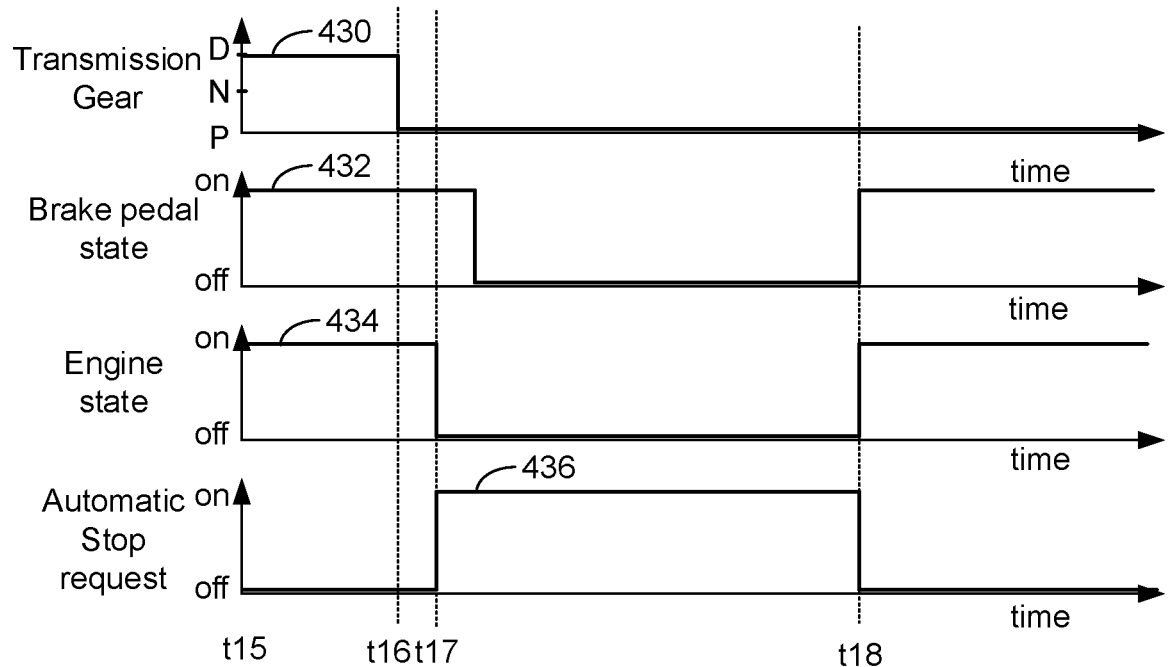

Referring now to FIG. 4D, a fourth engine automatic stopping and starting sequence is shown. At time t15, the transmission is in drive as is indicated by trace 430 and the engine is on as is indicated by trace 434. The driver is applying the brake pedal and the automatic engine stop request is not asserted. The vehicle may be stopped or decelerating during such conditions.

At time t16, the driver shifts the transmission into park while applying the brake pedal. The engine remains on and the automatic engine stop request is not asserted. Such conditions may be present when the vehicle is fully stopped in a parking lot or a traffic jam.

At time t17, the engine is automatically stopped as indicated by engine state trace 434 in response to the automatic engine stop request indicated by trace 436. The engine is automatically stopped in response to vehicle conditions, such as driver demand torque being less than a threshold torque and battery SOC being greater than a threshold SOC. The engine stop is indicated by trace 434 transitioning to a lower level and trace 436 transitioning to a higher level. The transmission remains in park and the brake pedal remains in an applied state as indicated by trace 432 being at a higher level.

Between time t17 and time t18, the driver fully releases the brake pedal as indicated by trace 432 transitioning to a lower level. The transmission remains in park and the engine remains stopped.

At time t18, the driver applies the brake pedal and the automatically stopped engine is restarted in response to the brake pedal being applied as is indicated by engine state trace 434 transitioning to a higher level and the automatic engine stop request state 436 transitioning to a lower level. The transmission is engaged in park, which indicates that the brake pedal may be used as an early indication of a driver's request to accelerate the vehicle. Thus, even if the transmission was engaged in park before the engine was automatically stopped, application of the brake pedal may be used as an indication to restart the engine so that fluid supplied to transmission gear clutches is at a sufficient pressure to enable gear shifting and torque delivery from the engine to vehicle wheels.

Figure 4E:
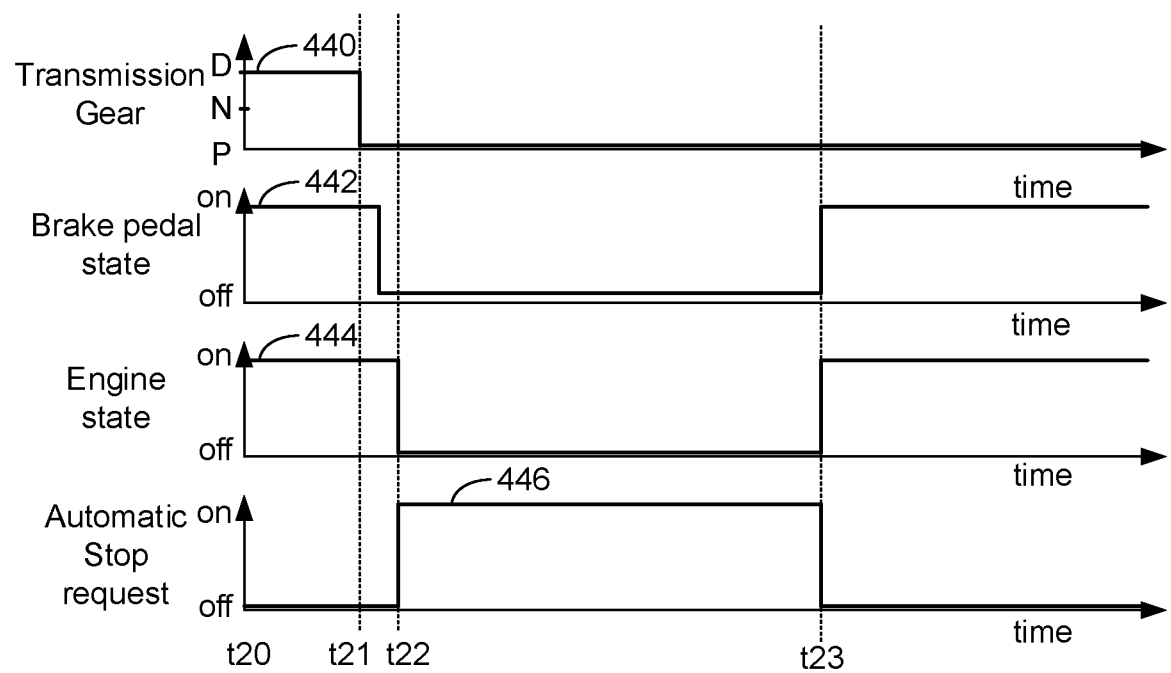

Referring now to FIG. 4E, a fifth engine automatic stopping and starting sequence is shown. At time t20, the transmission is in drive as is indicated by trace 440 and the engine is on as is indicated by trace 444. The driver is applying the brake pedal and the automatic engine stop request is not asserted. The vehicle may be stopped or decelerating during such conditions.

At time t21, the driver shifts the transmission into park while applying the brake pedal. The engine remains on and the automatic engine stop request is not asserted. Such conditions may be present when the vehicle is stopped in a traffic jam. The driver fully releases the brake pedal after the transmission is shifted into park and the vehicle does not move when the brake pedal is released since the transmission is engaged in park.

At time t22, the engine is automatically stopped as indicated by engine state trace 444 in response to the automatic engine stop request indicated by trace 446. The engine is automatically stopped in response to vehicle conditions, such as driver demand torque being less than a threshold torque and battery SOC being greater than a threshold SOC. The engine stop is indicated by trace 444 transitioning to a lower level and trace 446 transitioning to a higher level.

At time t23, the driver applies the brake pedal and the automatically stopped engine is restarted in response to the brake pedal being applied as is indicated by engine state trace 444 transitioning to a higher level and the automatic engine stop request state 446 transitioning to a lower level. The transmission is engaged in park, which indicates that the brake pedal being applied may be used as an early indication that the driver will soon be demanding torque to accelerate the vehicle. Thus, the engine may be automatically restarted in response to applying a brake pedal even if the brake pedal was released before the engine was automatically stopped.

Figure 4F:
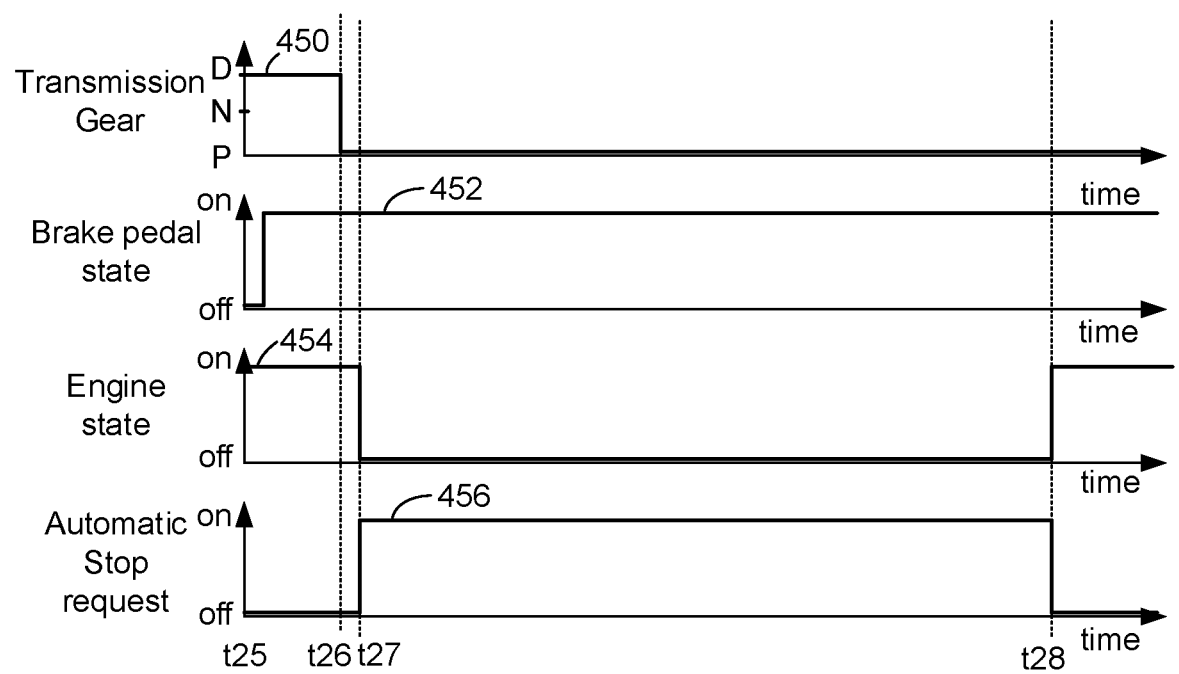

Referring now to FIG. 4F, a sixth engine automatic stopping and starting sequence is shown. At time t25, the transmission is in drive as is indicated by trace 450 and the engine is on as is indicated by trace 454. The driver is applying the brake pedal and the automatic engine stop request is not asserted. The vehicle may be stopped or decelerating during such conditions.

At time t26, the driver shifts the transmission into park while applying the brake pedal. The engine remains on and the automatic engine stop request is not asserted. Such conditions may be present when the vehicle is stopped in a parking lot or a traffic jam. The driver does not fully release the brake pedal after the transmission is shifted into park.

At time t27, the engine is automatically stopped as indicated by engine state trace 454 in response to the automatic engine stop request indicated by trace 456. The engine is automatically stopped in response to vehicle conditions, such as driver demand torque being less than a threshold torque and battery SOC being greater than a threshold SOC. The engine stop is indicated by trace 454 transitioning to a lower level and automatic engine stop request trace 456 transitioning to a higher level. The driver continues to apply the brake pedal as indicated by trace 452 remaining at a higher level.

At time t28, a threshold amount of time has elapsed since the engine was automatically stopped at time t27. Further, the brake pedal has not been release since the engine was automatically stopped at time t27. Therefore, the engine is automatically restarted without the driver having released the brake pedal after the engine was automatically stopped. The engine is restarted because there is no indication that the driver intends to release the brake pedal and because restarting the engine allows pressure of transmission fluid to increase before the driver may shift from park to drive. As such, the engine may be started before the transmission is shifted into drive even if the driver provides no indication of a vehicle launch before shifting the transmission. Further, in some examples, if the engine has been stopped for only a short amount of time and the driver does not release the brake pedal after the engine is automatically stopped while the transmission is in park, the engine may be restarted in response to the driver shifting out of park. Consequently, the engine may be started and transmission fluid pressure may be increased before the transmission is engaged into drive. Thus, the engine may be restarted even if the driver fails to release the brake before the transmission shifter moves to the drive position.

Figure 4G:
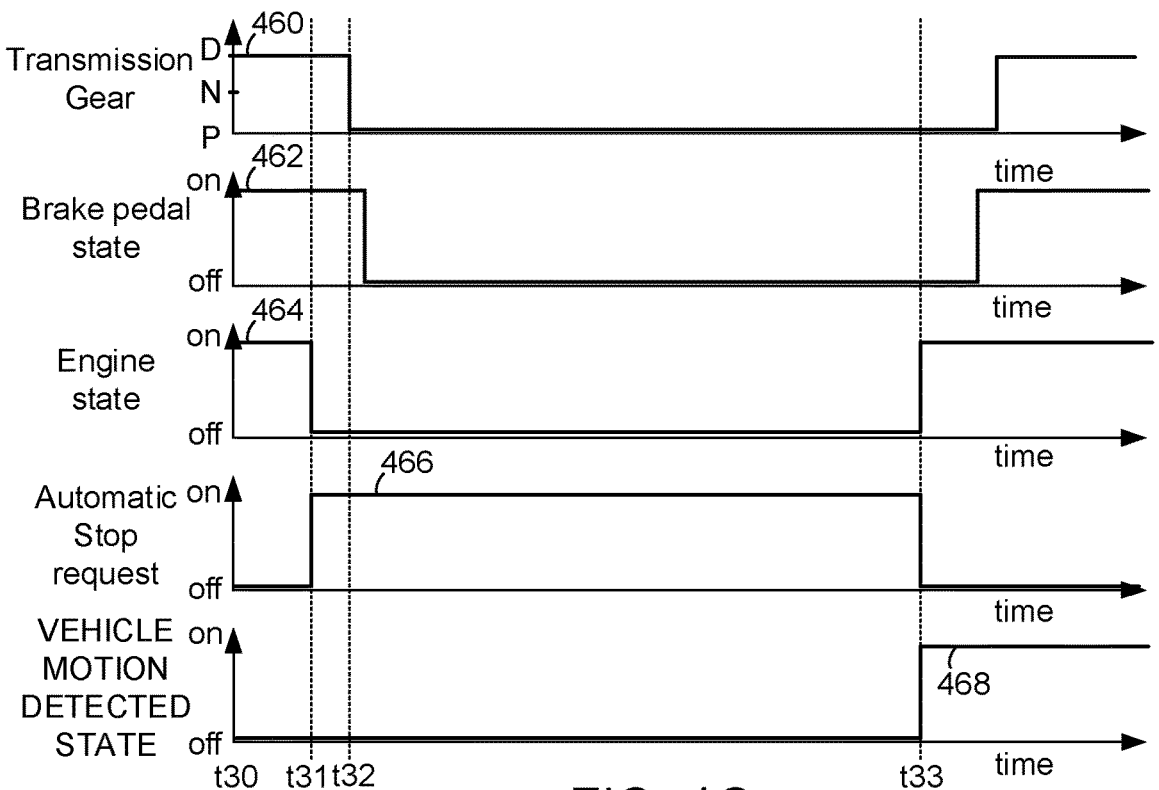

Referring now to FIG. 4G, it includes plots of the same variables as FIGS. 4A-4F. For the sake of brevity, the description of transmission gear, brake pedal state, engine state, and engine automatic stop request will not be repeated, but these variables in FIG. 4G are the same as they are described in FIG. 4A. FIG. 4G includes also includes a plot of vehicle motion detected state. The vertical axis represents vehicle motion detected state. The vehicle motion detected state is a variable that indicates whether or not motion of a vehicle in the path of the present vehicle is detected via sensors onboard the present vehicle. Motion of a vehicle in the path of the present vehicle described herein is detected when trace 468 is at a high level near the vertical axis arrow. Motion of a vehicle in the path of the present vehicle described herein is not detected when trace 468 is at a lower level near the horizontal axis. Motion of the vehicle may be detected via RADAR, LIDAR, camera, or other known device. The horizontal axis represents time and time increases from the left side of the plot to the right side of the plot.

At time t30, the transmission is in drive as is indicated by trace 460 and the engine is on as is indicated by trace 464. The driver is applying the brake pedal and the automatic engine stop request is not asserted. The vehicle may be stopped or decelerating during such conditions.

At time t31, the engine is automatically stopped as indicated by engine state trace 464 in response to the automatic engine stop request indicated by trace 466. The engine is automatically stopped in response to vehicle conditions, such as driver demand torque being less than a threshold torque and battery SOC being greater than a threshold SOC. The engine stop is indicated by trace 464 transitioning to a lower level and automatic engine stop request trace 466 transitioning to a higher level. The driver continues to apply the brake pedal as indicated by trace 462 remaining at a higher level. The driver leaves the transmission engaged in drive.

At time t32, the driver shifts the transmission into park while applying the brake pedal. The driver then releases the brake pedal a short time later. The engine remains off and the automatic engine stop request remains asserted. The engine remains automatically stopped between time t32 and time t33.

At time t33, the vehicle motion detected state changes to a high level to indicate that a vehicle in the path of the present vehicle is beginning to move. The vehicle may begin to move in response to other traffic in a traffic jam beginning to move (not shown). The automatic engine stop request is withdrawn in response to the vehicle motion detected state being asserted. The engine is started in response to the automatic engine stop request being withdrawn. The driver applies the brake pedal shortly after time t33 and then the driver shifts the transmission into drive. Thus, the engine is started before the driver shifts the transmission into drive so that there is sufficient pressure available to close the transmission gear clutches.

Thus, vehicle motion detecting sensors may provide even more time to restart an engine before a driver requests engine torque to be delivered to the vehicle's wheels. The additional time may allow the engine to increase transmission pump output pressure so that transmission gears may be shifted as is desired. Further, the additional time may allow the engine's torque capacity to be increased so that the driveline has capacity to meet driver demand torque.

Figure 4H:
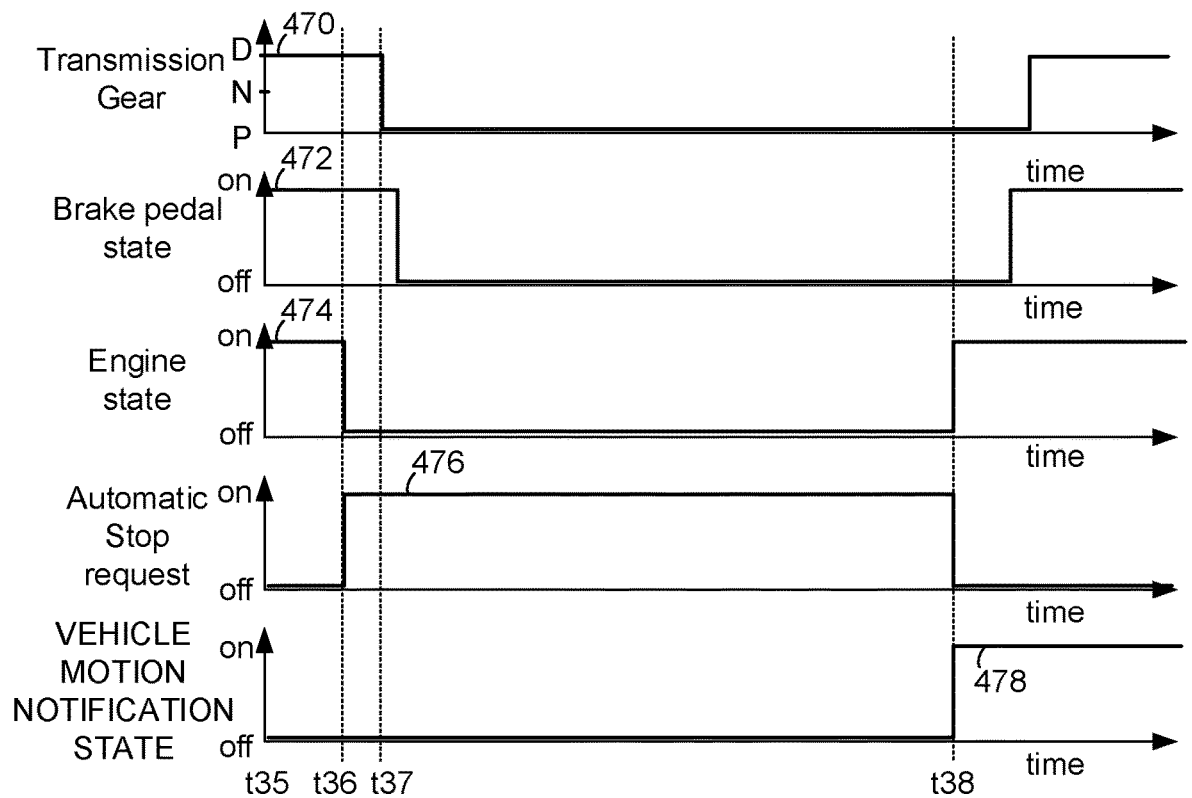
Figure 5:
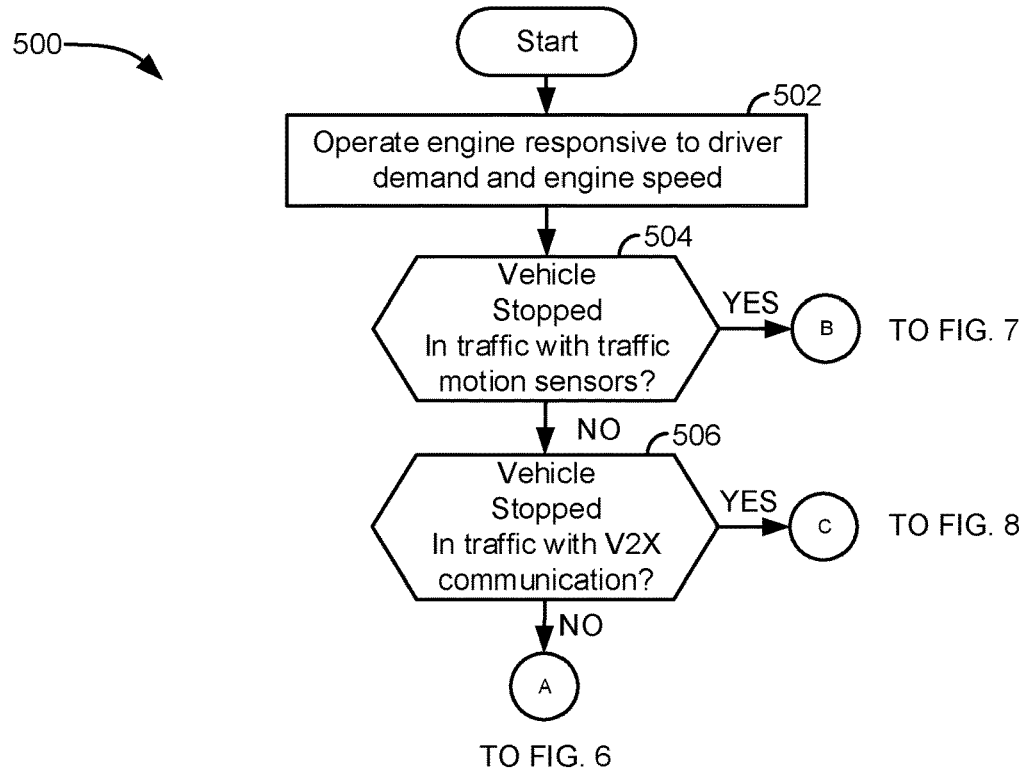
FIGS. 5-8 show an example method for operating a vehicle that may be automatically stopped and started.
Figure 6:
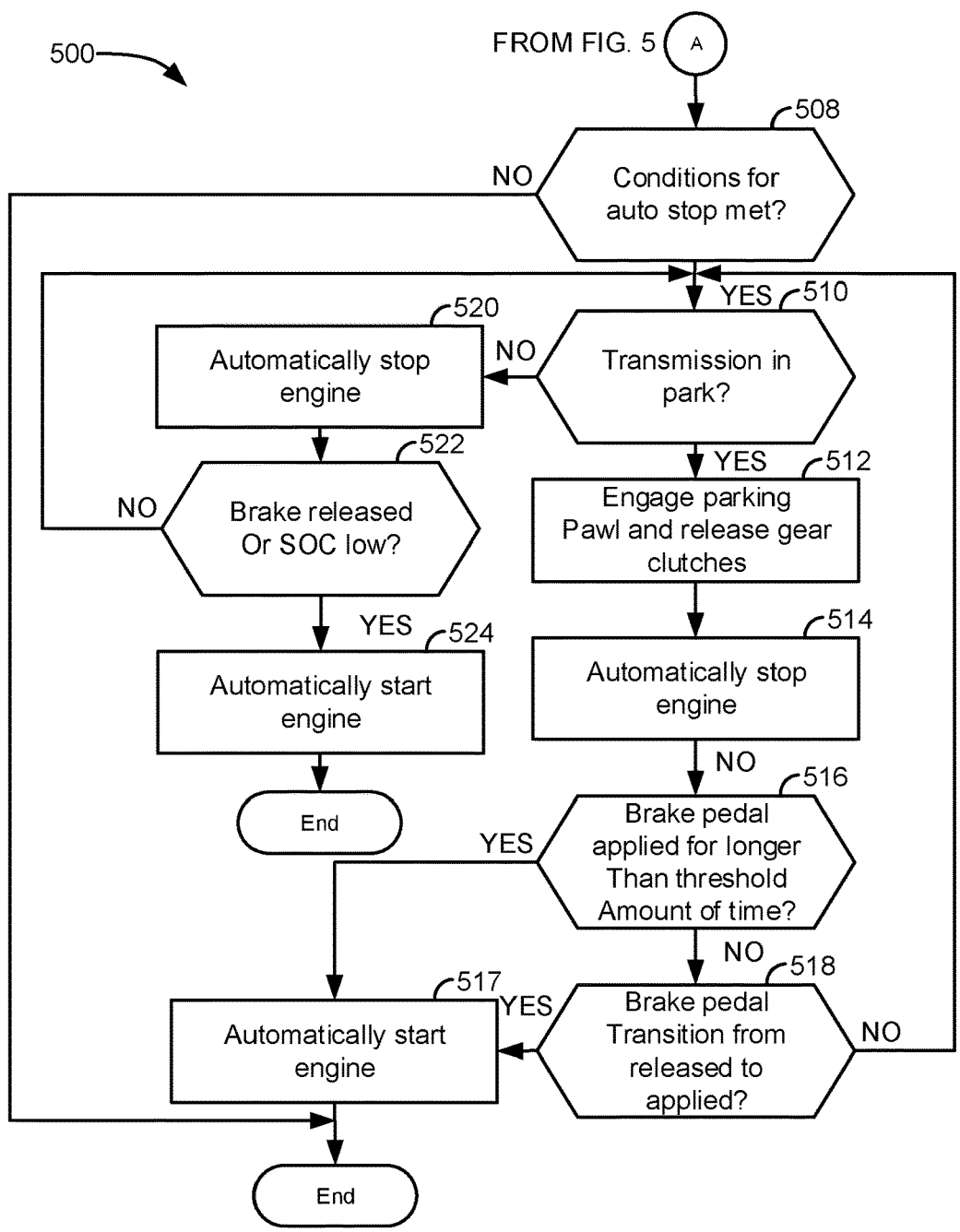
Figure 7:
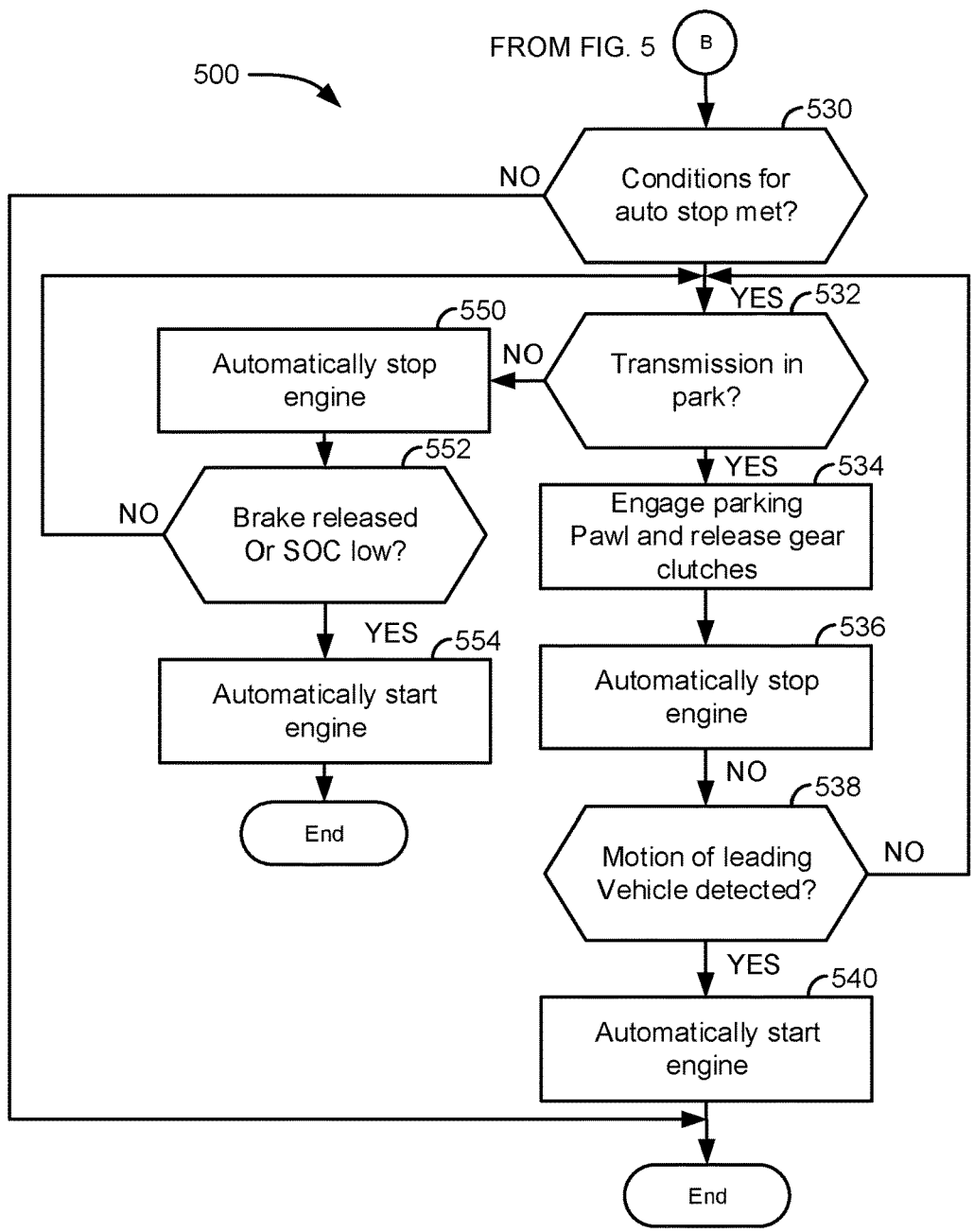
Figure 8:
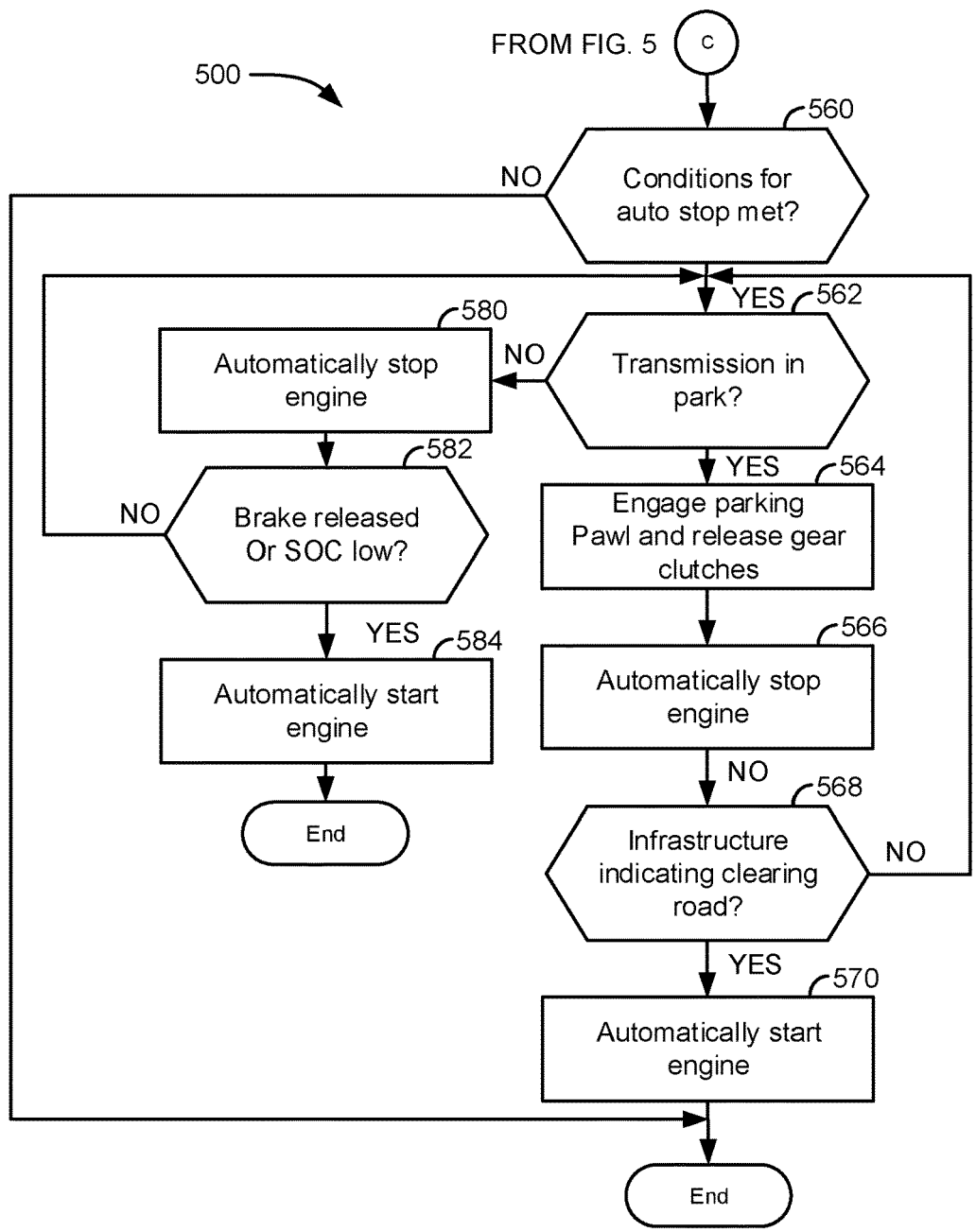

Referring now to FIG. 4H, it includes plots of the same variables as FIGS. 4A-4F. For the sake of brevity, the description of transmission gear, brake pedal state, engine state, and engine automatic stop request will not be repeated, but these variables in FIG. 4H are the same as they are described in FIG. 4A. FIG. 4H includes also includes a plot of vehicle motion notification state. The vertical axis represents vehicle motion notification state. The vehicle motion notification state indicates if infrastructure (e.g., traffic controllers, bridge controllers, rail road crossing controllers, etc.) or other vehicles are providing data that indicates that the vehicle described herein may soon have clearance to proceed in its present direction. For example, the data may be an indication from infrastructure that a rail road crossing is about to open to allow traffic to proceed. In another example, the indication may be from a second vehicle in the path of the vehicle described herein that the second vehicle is moving, thereby providing clearance to the vehicle described herein to move. The vehicle motion notification state is asserted when trace 478 is at a high level near the vertical axis arrow, which indicates that the vehicle described herein may soon have clearance to proceed on its journey. The vehicle motion notification is not asserted when trace 478 is at a lower level near the horizontal axis. The horizontal axis represents time and time increases from the left side of the plot to the right side of the plot.

At time t35, the transmission is in drive as is indicated by trace 470 and the engine is on as is indicated by trace 474. The driver is applying the brake pedal and the automatic engine stop request is not asserted. The vehicle may be stopped or decelerating during such conditions.

At time t36, the engine is automatically stopped as indicated by engine state trace 474 in response to the automatic engine stop request indicated by trace 476. The engine is automatically stopped in response to vehicle conditions, such as driver demand torque being less than a threshold torque and battery SOC being greater than a threshold SOC. The engine stop is indicated by trace 474 transitioning to a lower level and automatic engine stop request trace 476 transitioning to a higher level. The driver continues to apply the brake pedal as indicated by trace 472 remaining at a higher level. The driver leaves the transmission engaged in drive.

At time t37, the driver shifts the transmission into park while applying the brake pedal. The driver then releases the brake pedal a short time later. The engine remains off and the automatic engine stop request remains asserted. The engine remains automatically stopped between time t36 and time t37.

At time t38, the vehicle motion notification state changes to a high level to indicate that the vehicle described herein may soon be allowed to move. The vehicle described herein may be allowed to move in response to a traffic signal changing, a railroad gate opening, or another indication from infrastructure or other vehicles. The automatic engine stop request is withdrawn in response to the vehicle motion notification state being asserted. The engine is started in response to the automatic engine stop request being withdrawn. The driver applies the brake pedal shortly after time t38 and then the driver shifts the transmission into drive. Thus, the engine is started before the driver shifts the transmission into drive so that there is sufficient pressure available to close the transmission gear clutches.

Thus, infrastructure and other vehicles may provide even more time to restart an engine before a driver requests engine torque to be delivered to the vehicle's wheels. The additional time may allow the engine to increase transmission pump output pressure so that transmission gears may be shifted as is desired. Further, the additional time may allow the engine's torque capacity to be increased so that the driveline has capacity to meet driver demand torque.

Referring now to FIGS. 5-8, a method for operating a vehicle is shown. At least portions of method 500 may be implemented as executable controller instructions stored in non-transitory memory. Additionally, portions of method 500 may be actions taken in the physical world to transform an operating state of an actuator or device. The method of FIGS. 5-8 may be incorporated into the system of FIGS. 1-3 as executable instructions stored in non-transitory memory.

At 502, method 500 operates an engine according to driver demand torque and engine speed. The driver demand torque may be input via the vehicle's accelerator pedal and accelerator pedal position may be converted into a driver demand torque. The engine air amount, spark timing, and fuel amount may then be determined via maps and/or functions that reference the tables or functions via engine speed and driver demand torques. Values in the tables may be empirically determined via operating the engine on a dynamometer and adjusting engine operation responsive to the driver demand torque and engine speed. Method 500 proceeds to 504.

At 504, method 500 judges if the vehicle is stopped in traffic and the vehicle includes sensors for determining the motion of vehicles in traffic (e.g., motion of a vehicle in front of the vehicle described herein). In one example, method 500 may judge if the vehicle includes sensors to determine traffic motion based on values of variables stored in controller memory. For example, if the vehicle described herein includes a camera a first variable stored in memory may have a value of one. However, if the vehicle described herein does not include a camera, the value of the variable may be zero. Method 500 also judges if the present vehicle is stopped in traffic. In one example, method 500 may judge that the vehicle is stopped in traffic if a global positioning system indicates that the vehicle described herein is traveling on a road and stopped. If method 500 judges that vehicle is stopped in traffic and the vehicle includes sensors for determining the motion of vehicles in traffic, then the answer is yes and method 500 proceeds to 530 of FIG. 7. Otherwise, the answer is no and method 500 proceeds to 506.

At 506, method 500 judges if the vehicle is stopped in traffic and if the vehicle is in communication with other vehicles and/or infrastructure (e.g., electronic traffic controllers, bridge traffic controllers, traffic signals, etc.). In one example, method 500 may judge if the vehicle includes sensors to communicate with other vehicles and/or infrastructure based on values of variables stored in controller memory. For example, if the vehicle described herein includes a transceiver or receiver for communicating with other vehicles and/or infrastructure then a first variable stored in memory may have a value of one. However, if the vehicle described herein does not include a receiver for communicating with other vehicles and/or infrastructure, then the value of the variable may be zero. Method 500 also judges if the present vehicle is stopped in traffic. In one example, method 500 may judge that the vehicle is stopped in traffic if a global positioning system indicates that the vehicle described herein is traveling on a road and stopped. If method 500 judges that vehicle is stopped in traffic and the vehicle includes sensors for communicating with other vehicles and/or infrastructure, then the answer is yes and method 500 proceeds to 560 of FIG. 8. Otherwise, the answer is no and method 500 proceeds to 508 of FIG. 6.

At 508, method 500 judges if conditions are present to automatically stop the vehicle's engine (e.g., stop the engine via the controller responding to inputs other than a user or driver input that has a specific dedicated function of requesting engine stop or start). In one example, method 500 may automatically stop the engine when driver demand torque is less than a threshold torque and when engine speed is less than a threshold speed. Further, method 500 may require that other conditions be present to request automatic engine stopping. For example, method 500 may require that battery state of charge (SOC) is greater than a threshold SOC to permit automatic engine stopping. If method 500 judges that conditions are present for automatic engine stopping, the answer is yes and method 500 proceeds to 510. Otherwise, the answer is no and method 500 proceeds to exit.

At 510, method 500 judges if the vehicle's transmission is commanded to park. In one example, method 500 may determine that the vehicle's transmission is commanded to park in response to a position of a shifter. The position of the shifter may be determined via a sensor. If method 500 judges that the transmission is commanded park (e.g., the shifter's position indicates park), the answer is yes and method 500 proceeds to 512. Otherwise, the answer is no and method 500 proceeds to 520.

At 512, method 500 engages the parking pawl and restricts movement of the vehicle's wheels. In addition, pressure of fluid supplied to transmission gear clutches is reduced such that the transmission gear clutches transfer zero torque. Thus, the transmission gear clutches are opened. Method 500 proceeds to 514 after engaging the parking pawl and reducing pressure of fluid supplied to transmission gear clutches.

At 514, method 500 automatically stops the engine. The engine may be stopped via ceasing to supply fuel and spark to the engine. Rotation of the engine stops when fuel and spark are not supplied to the engine. Method 500 proceeds to 516.

At 516, method 500 judges if the vehicle's brake pedal has been applied (e.g., fully or partially) without being release for longer than a threshold amount of time since the engine was most recently automatically stopped. In one example, a counter may be activated when the engine is automatically stopped at 514 and the timer may be incremented as long as the driver applies the brake pedal. If method 500 judges that the brake pedal has been applied for longer than a threshold amount of time without being released since the engine was most recently automatically stopped, then the answer is yes and method 500 proceeds to 517. Otherwise, the answer is no and method 500 proceeds to 518.

At 517, method 500 automatically starts the engine via engaging a starter, rotating the engine, and supplying spark and fuel to the engine. The engine is automatically started without the driver applying an input that has a dedicated sole function of starting and stopping the engine (e.g., an ignition switch or pushbutton). Method 500 proceeds to exit after automatically starting the engine.

At 518, method 500 judges if the vehicle's brake pedal has been applied after the brake pedal was fully released while the engine was automatically stopped. If method 500 judges that the brake pedal has been applied after the brake pedal was fully released while the engine was automatically stopped, then the answer is yes and method 500 proceeds to 517. Otherwise, the answer is no and method 500 returns to 510.

At 520, method 500 automatically stops the engine. The engine may be stopped via ceasing to supply fuel and spark to the engine. Rotation of the engine stops when fuel and spark are not supplied to the engine. Method 500 proceeds to 522.

At 522, method 500 judges if the brake pedal has been fully released or if battery SOC is less than a threshold SOC. Method 500 may judge that the brake pedal has been fully released based on a position of a brake pedal sensor. For example, if output of the brake pedal sensor is less than a threshold voltage, then method 500 may determine that the brake pedal is fully released. Method 500 may judge that battery SOC is less than a threshold SOC based on battery voltage. If method 500 judges that the brake pedal has been fully released or if the battery SOC is less than the threshold SOC, the answer is yes and method 500 proceeds to 524. Otherwise, the answer is no and method 500 returns to 510.

At 524, method 500 automatically starts the engine via engaging a starter, rotating the engine, and supplying spark and fuel to the engine. The engine is automatically started without the driver applying an input that has a dedicated sole function of starting and stopping the engine (e.g., an ignition switch or pushbutton). Method 500 proceeds to exit after automatically starting the engine.

At 530, method 500 judges if conditions are present to automatically stop the vehicle's engine (e.g., stop the engine via the controller responding to inputs other than a user or driver input that has a specific dedicated function of requesting engine stop or start). If method 500 judges that conditions are present for automatic engine stopping, the answer is yes and method 500 proceeds to 532. Otherwise, the answer is no and method 500 proceeds to exit.

At 532, method 500 judges if the vehicle's transmission is commanded to park. In one example, method 500 may determine that the vehicle's transmission is commanded to park in response to a position of a shifter. The position of the shifter may be determined via a sensor. If method 500 judges that the transmission is commanded park (e.g., the shifter's position indicates park), the answer is yes and method 500 proceeds to 534. Otherwise, the answer is no and method 500 proceeds to 550.

At 534, method 500 engages the parking pawl and restricts movement of the vehicle's wheels. In addition, pressure of fluid supplied to transmission gear clutches is reduced such that the transmission gear clutches transfer zero torque. Thus, the transmission gear clutches are opened. Method 500 proceeds to 536 after engaging the parking pawl and reducing pressure of fluid supplied to transmission gear clutches.

At 536, method 500 automatically stops the engine. The engine may be stopped via ceasing to supply fuel and spark to the engine. Rotation of the engine stops when fuel and spark are not supplied to the engine. Method 500 proceeds to 538.

At 538, method 500 judges if motion of a vehicle in the path of the present vehicle (e.g., the vehicle described herein) is detected. Motion of the vehicle in the present vehicle's path of travel may be detected via RADAR, LIDAR, a camera, or other known device or system. If method 500 judges that the vehicle in the path of the present vehicle is moving, the answer is yes and method 500 proceeds to 540. Otherwise, the answer is no and method 500 returns to 532.

At 540, method 500 automatically starts the engine via engaging a starter, rotating the engine, and supplying spark and fuel to the engine. The engine is automatically started without the driver applying an input that has a dedicated sole function of starting and stopping the engine (e.g., an ignition switch or pushbutton). Method 500 proceeds to exit after automatically starting the engine. By automatically starting the engine in response to an indication that a vehicle in the travel path of the present vehicle is moving, it may be possible to start the engine and increase transmission fluid pump output so that transmission gears may be timely engaged when the driver shifts to drive.

At 550, method 500 automatically stops the engine. The engine may be stopped via ceasing to supply fuel and spark to the engine. Rotation of the engine stops when fuel and spark are not supplied to the engine. Method 500 proceeds to 552.

At 552, method 500 judges if the brake pedal has been fully released or if battery SOC is less than a threshold SOC. Method 500 may judge that the brake pedal has been fully released based on a position of a brake pedal sensor. For example, if output of the brake pedal sensor is less than a threshold voltage, then method 500 may determine that the brake pedal is fully released. Method 500 may judge that battery SOC is less than a threshold SOC based on battery voltage. If method 500 judges that the brake pedal has been fully released or if the battery SOC is less than the threshold SOC, the answer is yes and method 500 proceeds to 554. Otherwise, the answer is no and method 500 returns to 532.

At 554, method 500 automatically starts the engine via engaging a starter, rotating the engine, and supplying spark and fuel to the engine. The engine is automatically started without the driver applying an input that has a dedicated sole function of starting and stopping the engine (e.g., an ignition switch or pushbutton). Method 500 proceeds to exit after automatically starting the engine.

At 560, method 500 judges if conditions are present to automatically stop the vehicle's engine (e.g., stop the engine via the controller responding to inputs other than a user or driver input that has a specific dedicated function of requesting engine stop or start). If method 500 judges that conditions are present for automatic engine stopping, the answer is yes and method 500 proceeds to 562. Otherwise, the answer is no and method 500 proceeds to exit.

At 562, method 500 judges if the vehicle's transmission is commanded to park. In one example, method 500 may determine that the vehicle's transmission is commanded to park in response to a position of a shifter. The position of the shifter may be determined via a sensor. If method 500 judges that the transmission is commanded park (e.g., the shifter's position indicates park), the answer is yes and method 500 proceeds to 564. Otherwise, the answer is no and method 500 proceeds to 580.

At 564, method 500 engages the parking pawl and restricts movement of the vehicle's wheels. In addition, pressure of fluid supplied to transmission gear clutches is reduced such that the transmission gear clutches transfer zero torque. Thus, the transmission gear clutches are opened. Method 500 proceeds to 566 after engaging the parking pawl and reducing pressure of fluid supplied to transmission gear clutches.

At 566, method 500 automatically stops the engine. The engine may be stopped via ceasing to supply fuel and spark to the engine. Rotation of the engine stops when fuel and spark are not supplied to the engine. Method 500 proceeds to 568.

At 568, method 500 judges if the present vehicle is receiving data that indicates that the present vehicle's travel path is clearing or is about to clear. An indication of the present vehicle's travel path clearing may be provided via vehicle to vehicle communication, communication with infrastructure such as an electronic traffic controller or rail road crossing controller, or other traffic control device. If method 500 judges that the present vehicle is receiving data that indicates that the present vehicle's travel path is clearing or is about to clear, the answer is yes and method 500 proceeds to 570. Otherwise, the answer is no and method 500 returns to 562.

At 570, method 500 automatically starts the engine via engaging a starter, rotating the engine, and supplying spark and fuel to the engine. The engine is automatically started without the driver applying an input that has a dedicated sole function of starting and stopping the engine (e.g., an ignition switch or pushbutton). Method 500 proceeds to exit after automatically starting the engine. By automatically starting the engine in response to data from other vehicles or infrastructure, it may be possible to start the engine and increase transmission fluid pump output so that transmission gears may be timely engaged when the driver shifts to drive.

At 580, method 500 automatically stops the engine. The engine may be stopped via ceasing to supply fuel and spark to the engine. Rotation of the engine stops when fuel and spark are not supplied to the engine. Method 500 proceeds to 582.

At 582, method 500 judges if the brake pedal has been fully released or if battery SOC is less than a threshold SOC. Method 500 may judge that the brake pedal has been fully released based on a position of a brake pedal sensor. For example, if output of the brake pedal sensor is less than a threshold voltage, then method 500 may determine that the brake pedal is fully released. Method 500 may judge that battery SOC is less than a threshold SOC based on battery voltage. If method 500 judges that the brake pedal has been fully released or if the battery SOC is less than the threshold SOC, the answer is yes and method 500 proceeds to 584. Otherwise, the answer is no and method 500 returns to 562.

At 584, method 500 automatically starts the engine via engaging a starter, rotating the engine, and supplying spark and fuel to the engine. The engine is automatically started without the driver applying an input that has a dedicated sole function of starting and stopping the engine (e.g., an ignition switch or pushbutton). Method 500 proceeds to exit after automatically starting the engine.

In these ways, it may be possible to start an engine early before a driver (e.g., human or autonomous) of a vehicle commands the vehicle's transmission out of park and into drive so that transmission fluid pressure is sufficient to engage transmission gears and transfer engine torque to vehicle wheels. If the vehicle is equipped with one or more sensors that detect vehicle motion, the engine may be restarted in response to motion of another vehicle being detected. Further, if the vehicle receives data indicating that a vehicle in the present vehicle's path of travel is moving or a traffic signal has changed state, the engine may be restarted in response to motion of another vehicle being detected or the change in traffic signal state. In still other examples, the engine may be automatically restarted in response to applying the brake pedal while the transmission is engaged in park.

Thus, the method of FIGS. 5-8 provide for a vehicle operating method, comprising: automatically stopping an engine via a controller without receiving specific input from a driver via a dedicated engine start/stop input; and automatically starting the engine via the controller in response to applying a brake pedal while the engine is automatically stopped and a transmission is engaged in park. The method includes where the brake pedal is applied via a driver when the transmission is engaged in park, and further comprising determining that the brake pedal is applied via the controller. The method includes where the engine is automatically stopped while the transmission is engaged in drive. The method includes where the engine is automatically stopped while the transmission is in neutral.

In some examples, the method further comprises receiving an indication to the controller that the brake pedal is released after automatically stopping the engine and before automatically starting the engine. The method includes where the engine is automatically stopped while the transmission is engaged in park, and where all gear clutches of the transmission are fully released when the transmission is engaged in park. The method includes where automatically stopping the engine includes stopping the engine while the brake pedal is not applied and the transmission is engaged in park. The method includes where automatically stopping the engine includes stopping the engine while the brake pedal is applied and the transmission is engaged in park. The method further comprises receiving an indication to the controller that the brake pedal is released after automatically stopping the engine and before automatically starting the engine.

The method of FIGS. 5-8 also provides for a vehicle operating method, comprising: automatically stopping an engine via a controller without receiving specific input from a driver via a dedicated engine start/stop input; and automatically starting the engine via the controller in response to a brake pedal being applied for more than a threshold amount of time, and without the brake pedal having been at least partially released, while the engine is automatically stopped and a transmission is engaged in park. The method includes where the engine is automatically restarted while the brake pedal is applied. The method includes where all gear clutches of the transmission are fully released when the transmission is engaged in park.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A system, comprising:
    a vehicle including an engine;
    a transmission coupled to the engine;
    vehicle sensors configured to sense motion of vehicles in a path of the vehicle; and
    a controller including executable instructions stored in non-transitory memory to automatically stop the engine, and instructions to automatically start the engine after the engine is most recently automatically stopped, the engine automatically started while the transmission is engaged in park in response to the vehicle sensors detecting motion of the vehicles in the path of the vehicle.

2. The system of claim 1, further comprising additional instructions to automatically start the engine after the engine is most recently automatically stopped, the engine automatically started while the transmission is engaged in park in response to output of an infrastructure device that broadcasts road conditions.

3. The system of claim 1, further comprising additional instructions to automatically start the engine after the engine is most recently automatically stopped, the engine automatically started while the transmission is engaged in park in response to a human driver applying a brake pedal while the engine is automatically stopped and the transmission is engaged in park.

4. The system of claim 1, where the engine is automatically stopped while the transmission is in park.

5. The system of claim 1, where the engine is automatically stopped while the transmission is in drive.

6. The system of claim 1, where the engine is automatically stopped while the transmission is in neutral.

7. The system of claim 1, where the vehicle sensors configured to sense motion of the vehicles in the path of the vehicle include light detection and ranging (LIDAR) systems.

8. The system of claim 1, where the vehicle sensors configured to sense motion of the vehicles in the path of the vehicle include radio detection and ranging (RADAR) systems.

* * * * *